(12) United States Patent
Okita

(10) Patent No.: US 11,054,548 B2
(45) Date of Patent: Jul. 6, 2021

(54) PLASTIC OPTICAL FIBER, PLASTIC OPTICAL FIBER CABLE, CONNECTOR-ATTACHED PLASTIC OPTICAL FIBER CABLE, OPTICAL COMMUNICATION SYSTEM, AND PLASTIC OPTICAL FIBER SENSOR

(71) Applicant: ASAHI KASEI KABUSHIKI KAISHA, Tokyo (JP)

(72) Inventor: Koshi Okita, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/643,230

(22) PCT Filed: Aug. 31, 2018

(86) PCT No.: PCT/JP2018/032341
§ 371 (c)(1),
(2) Date: Feb. 28, 2020

(87) PCT Pub. No.: WO2019/045046
PCT Pub. Date: Mar. 7, 2019

(65) Prior Publication Data
US 2020/0264337 A1    Aug. 20, 2020

(30) Foreign Application Priority Data

Aug. 31, 2017  (JP) .............................. JP2017-167847

(51) Int. Cl.
*G02B 1/04* (2006.01)
*G02B 6/02* (2006.01)

(52) U.S. Cl.
CPC ............. *G02B 1/046* (2013.01); *G02B 1/048* (2013.01); *G02B 6/02042* (2013.01)

(58) Field of Classification Search
CPC ........ G02B 1/046; G02B 1/048; G02B 6/023; G02B 6/02319; G02B 6/02033;
(Continued)

(56) References Cited

U.S. PATENT DOCUMENTS 4,000,416 A    12/1976   Goell
5,608,835 A     3/1997   Ono et al.
(Continued)

FOREIGN PATENT DOCUMENTS

EP    0229202 A1    7/1987
JP    52-38238 A    3/1977
(Continued)

OTHER PUBLICATIONS

European Search Report, dated Aug. 25. 2020, for European Application No. 18850964.0.

*Primary Examiner* — John Bedtelyon
(74) *Attorney, Agent, or Firm* — Birch, Stewart, Kolasch & Birch, LLP

(57) ABSTRACT

A plastic optical fiber including a first cladding; a first core forming a first sea portion inside the first cladding; and a first island portion formed inside the first core with at least an outer periphery having a lower refractive index than the first sea portion, wherein the first core includes a polymethyl methacrylate-based resin.

18 Claims, 3 Drawing Sheets

(58) Field of Classification Search
CPC ............ G02B 6/02038; G02B 6/02042; G02B 6/02338; G02B 6/02; G02B 6/36; G02B 2006/12071
See application file for complete search history.

(56) References Cited

U.S. PATENT DOCUMENTS

| | | | |
|---|---|---|---|
| 8,472,768 B2 * | 6/2013 | Kai | G02B 6/02042 385/106 |
| 2005/0141834 A1 | 6/2005 | Murofushi | |
| 2006/0194046 A1 | 8/2006 | Ouderkirk et al. | |
| 2008/0166091 A1 | 7/2008 | Aoyagi et al. | |
| 2012/0148207 A1 | 6/2012 | Li et al. | |
| 2015/0318659 A1 | 11/2015 | Matsuo et al. | |
| 2016/0223761 A1 | 8/2016 | Nakanishi et al. | |
| 2017/0131707 A1 | 5/2017 | Sakimura et al. | |
| 2018/0120501 A1 | 5/2018 | Sasaki et al. | |
| 2018/0356590 A1 | 12/2018 | Amma et al. | |

FOREIGN PATENT DOCUMENTS

| | | |
|---|---|---|
| JP | 60-82605 U | 5/1985 |
| JP | 62-58115 A | 3/1987 |
| JP | 7-113920 A | 5/1995 |
| JP | 9-33737 A | 2/1997 |
| JP | 11-183738 A | 7/1999 |
| JP | 2000-89043 A | 3/2000 |
| JP | 2001-166174 A | 6/2001 |
| JP | 2004-93639 A | 3/2004 |
| JP | 2006-64766 A | 3/2006 |
| JP | 2007-249111 A | 9/2007 |
| JP | 2008-83155 A | 4/2008 |
| JP | 2008-158406 A | 7/2008 |
| JP | 2008-532086 A | 8/2008 |
| JP | 2010-145288 A | 7/2010 |
| JP | 2014-96398 A | 5/2014 |
| JP | 2015-169873 A | 9/2015 |
| JP | 2015-215567 A | 12/2015 |
| JP | 2016-212157 A | 12/2016 |
| JP | 2017-134374 A | 8/2017 |
| WO | WO 2004/046777 A1 | 6/2004 |
| WO | WO 2006/070624 A1 | 7/2006 |

* cited by examiner

[Figure 1]
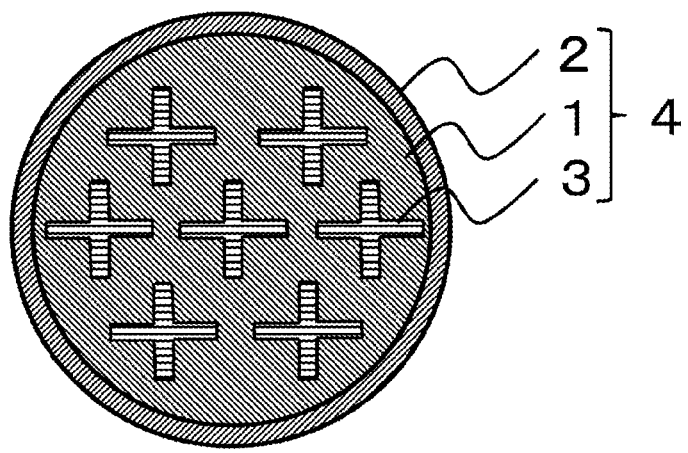
[Figure 2]
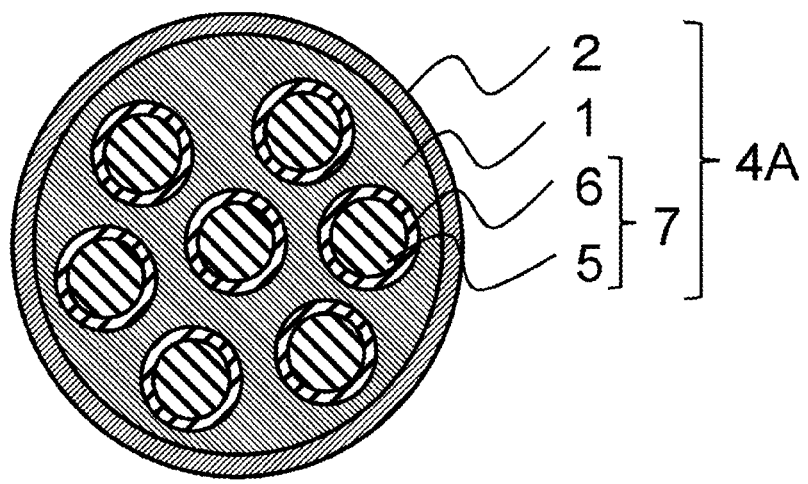

[Figure 3]
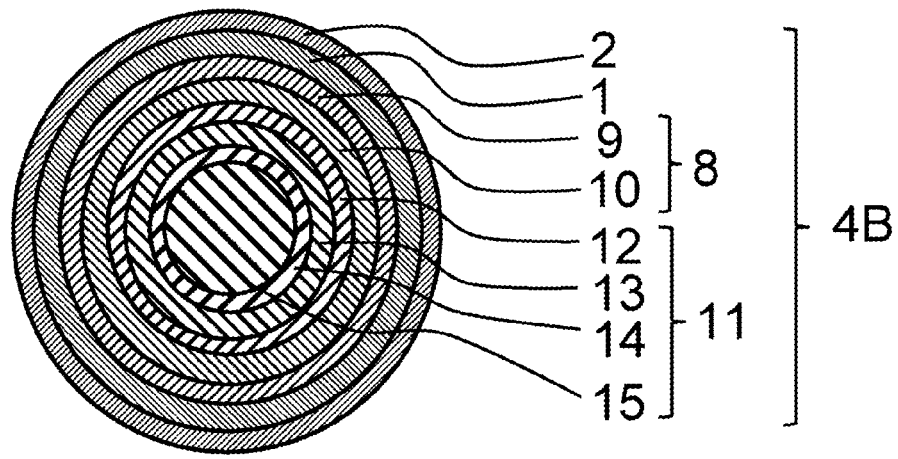
[Figure 4]
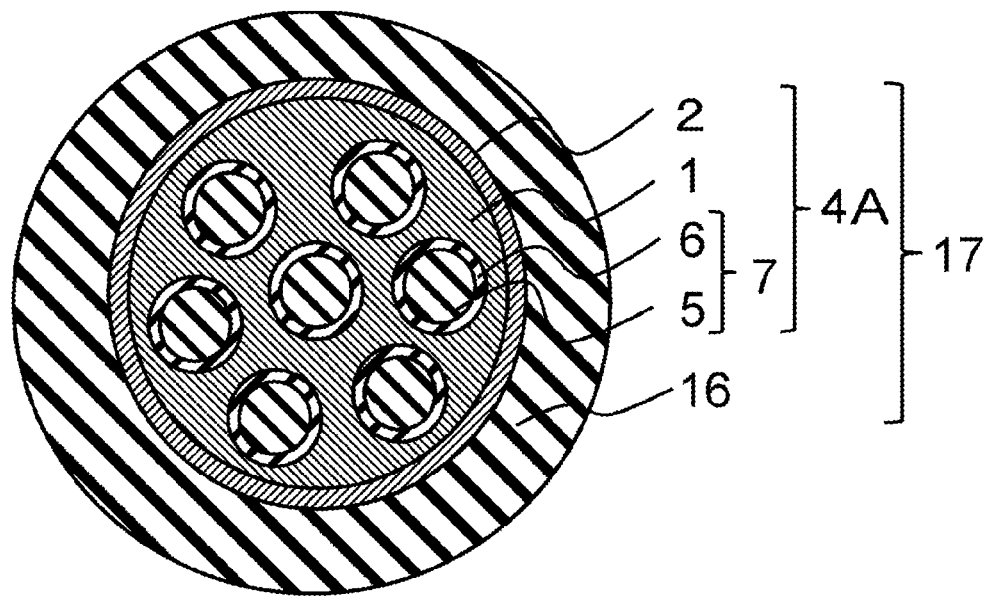

[Figure 5]
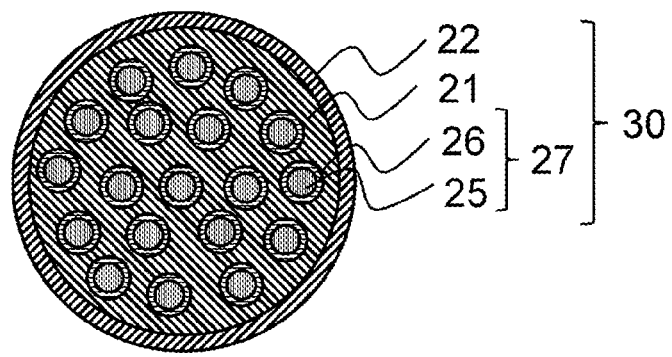
[Figure 6]
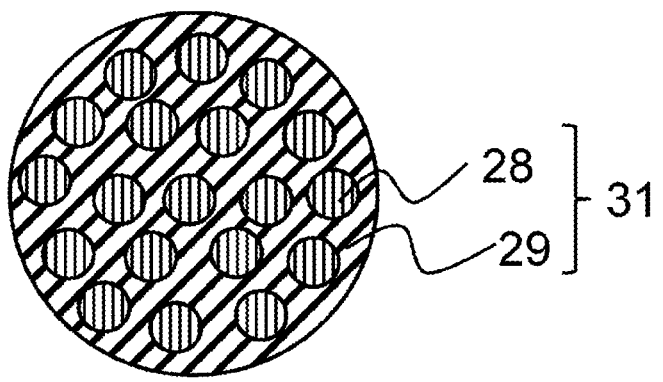
[Figure 7]
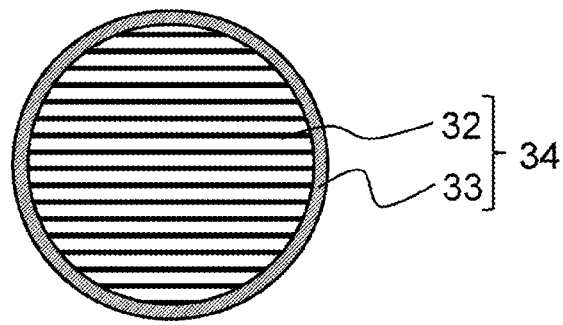

PLASTIC OPTICAL FIBER, PLASTIC OPTICAL FIBER CABLE, CONNECTOR-ATTACHED PLASTIC OPTICAL FIBER CABLE, OPTICAL COMMUNICATION SYSTEM, AND PLASTIC OPTICAL FIBER SENSOR

TECHNICAL FIELD

The present invention relates to a plastic optical fiber, a plastic optical fiber cable, a connector-attached plastic optical fiber cable, an optical communication system, and a plastic optical fiber sensor.

BACKGROUND ART

A step index type optical fiber is a medium that has a structure in which the periphery of a core comprising a transparent body is surrounded by a cladding comprising a solid having a lower refractive index than that of the transparent body, and transmits light in the core by the reflection of light at the boundary between the core and the cladding (for example, Patent Literature 1). Step index type optical fibers are classified by their materials into quartz glass optical fibers, multicomponent glass optical fibers, polymer-clad silica fibers, plastic optical fibers, and the like and classified by structure into single-core fibers having one core, and multicore fibers in which a plurality of cores are present. Step index type optical fibers have been conventionally widely used for illumination, optical data communication, photoelectric sensors, image transmission, and the like, and in recent years, the demand for plastic optical fibers has increased particularly in short distance optical transmission applications.

In cases where light is transmitted using these optical fibers, as the wire diameter increases, the amount of receivable light can be increased, and longer distance transmission is enabled. On the other hand, however, the bending loss increases, and particularly when the material is quartz or glass, even bending is difficult. As a method for solving these problems, it is known that the bending loss is reduced by providing a multicore structure (for example, Patent Literature 2).

CITATION LIST

Patent Literature

Patent Literature 1: Japanese Patent Laid-Open No. 2010-145288
Patent Literature 2: Japanese Patent Laid-Open No. 9-33737

SUMMARY OF DISCLOSURE

Technical Problem

However, problems of an optical fiber having a multicore structure like that of Patent Literature 2 are that the proportion of the cladding in the cross-sectional area increases, causing a decrease in the amount of receivable light, and further the mechanical strength of the interface between the core and the cladding is weak, and peeling occurs easily. In addition, in Patent Literature 2, reducing connection loss has not been studied.

Accordingly, it is an object of the present invention to provide a plastic optical fiber (for example, a step index type optical fiber) that simultaneously satisfies a reduction in bending loss, a reduction in connection loss, and a reduction in transmission loss.

Solution to Problem

The present inventor has studied diligently in order to solve the problems of the conventional art described above, and as a result found that the problems of the conventional art can be solved by forming an island portion having a lower refractive index than a sea portion, inside a core comprising a polymethyl methacrylate-based resin (PMMA-based resin) forming the sea portion. Thus, the present inventor has completed the present invention. Usually, the core of an optical fiber (for example, a step index type optical fiber) is a portion that propagates light, and therefore it is considered that no foreign bodies should be allowed to be present in the interior except, for example, the vacancies of a photonic crystal fiber as described in Patent Literature 1, and the finding has been a surprising result.

Specifically, the present invention is as follows.

[1]
A plastic optical fiber comprising:
a first cladding;
a first core forming a first sea portion inside the first cladding; and
a first island portion formed inside the first core with at least an outer periphery having a lower refractive index than the first sea portion,
wherein the first core comprises a polymethyl methacrylate-based resin.

[2]
The plastic optical fiber of [1], comprising a plurality of the first island portions.

[3]
The plastic optical fiber of [1] or [2], wherein the first island portion has a second cladding and a second core forming a second sea portion inside the second cladding.

[4]
The plastic optical fiber of [3], further comprising a second island portion inside the second core.

[5]
The plastic optical fiber of [4], wherein the second island portion has a structure in which one or more claddings and one or more cores are alternately formed in this order toward an inner direction.

[6]
The plastic optical fiber of any of [1] to [5], wherein when the plastic optical fiber comprises a plurality of cores, the respective cores constituting the plastic optical fiber are formed of the same material.

[7]
The plastic optical fiber of any of [1] to [6], wherein a total of cross-sectional areas of the cores constituting the plastic optical fiber accounts for 50% or more of an entire cross-sectional area of the optical fiber.

[8]
The plastic optical fiber of any of [1] to [7], wherein when the plastic optical fiber comprises a plurality of claddings, the respective claddings constituting the plastic optical fiber are formed of the same material.

[9]
The plastic optical fiber of any of [1] to [8], wherein at least one of the claddings constituting the plastic optical fiber is a fluororesin.

[10]

The plastic optical fiber of any of [1] to [9], comprising a layer having a lower refractive index than the first cladding, outside the first cladding.

[11]

The plastic optical fiber of any of [1] to [10], for use in distorted wiring.

[12]

The plastic optical fiber of any of [1] to [11], for use in multi-coupled wiring.

[13]

A plastic optical fiber cable comprising:
the plastic optical fiber of any of [1] to [12]; and
a resin coating the plastic optical fiber.

[14]

A connector-attached plastic optical fiber cable comprising:
the plastic optical fiber cable of [13]; and
connectors attached to both ends of the plastic optical fiber cable.

[15]

The connector-attached plastic optical fiber cable of [14], wherein the connectors are attached to the plastic optical fiber cable in a welded state.

[16]

An optical communication system comprising the plastic optical fiber of any of [1] to [12], the plastic optical fiber cable of [13], or the connector-attached plastic optical fiber cable of [14] or [15].

[17]

The optical communication system of [16], wherein the plastic optical fiber cable has a plurality of cores, and light passing through the cores comes from the same light source.

[18]

A plastic optical fiber sensor comprising the plastic optical fiber of any of [1] to [12].

Advantageous Effect of Invention

According to the present invention, it is possible to provide a plastic optical fiber that simultaneously satisfies a reduction in bending loss, a reduction in connection loss, and a reduction in transmission loss.

BRIEF DESCRIPTION OF DRAWINGS

FIG. 1 shows one example of a schematic view of the plastic optical fiber in the present embodiment.

FIG. 2 shows another example of a schematic cross-sectional view of the plastic optical fiber in the present embodiment.

FIG. 3 shows still another example of a schematic cross-sectional view of the plastic optical fiber in the present embodiment.

FIG. 4 shows one example of a schematic cross-sectional view of the plastic optical fiber cable in the present embodiment.

FIG. 5 shows a schematic cross-sectional view of the plastic optical fibers of Examples 1 to 3 in the present embodiment.

FIG. 6 shows a schematic cross-sectional view of the plastic optical fiber of Comparative Example 1.

FIG. 7 shows a schematic cross-sectional view of the plastic optical fiber of Comparative Example 2.

DESCRIPTION OF EMBODIMENT

A mode for carrying out the present invention (hereinafter simply referred to as "the present embodiment") will be described in detail below. The present embodiment below is an illustration for describing the present invention and is not intended to limit the present invention to the following contents. Appropriate modifications can be made to the present invention without departing from the spirit thereof.

<Plastic Optical Fiber>

The plastic optical fiber (for example, a step index type optical fiber is included and the "plastic optical fiber" will hereinafter sometimes be simply referred to as an "optical fiber") in the present embodiment has a first cladding, a first core forming a first sea portion inside the first cladding, and a first island portion formed inside the first core with at least the outer periphery having a lower refractive index than the first sea portion, and the first core comprises a polymethyl methacrylate-based resin (PMMA-based resin).

Conventionally, for multicore type optical fibers, the value of connection loss has tended to be large. Although not intended to be bound by any logic, this is considered to be because when multicore type optical fibers are connected to each other, it is difficult to allow the connection positions of one plurality of cores accurately correspond to those of the other plurality of cores, and thus light loss occurs.

It has been found by the present inventors that optical fibers of a sea-island structure type like the structure in the present embodiment remedy the connection loss. Particularly, the present inventors have studied diligently and also found that when a core as a sea portion comprises a PMMA-based resin, flexibility is provided to the optical fiber to improve durability, and reductions in bending loss and transmission loss can be achieved.

In other words, the plastic optical fiber in the present embodiment can simultaneously satisfy a reduction in bending loss, a reduction in connection loss, and a reduction in transmission loss by the adoption of this sea-island structure and the PMMA-based resin.

The plastic optical fiber in the present embodiment can be applied, for example, to plastic optical fibers for illumination, for optical data communication, for sensors such as photoelectric sensors, and for image transmission.

FIG. 1 shows a schematic cross-sectional view of one example of the plastic optical fiber in the present embodiment. In FIG. 1, a plastic optical fiber 4 (hereinafter also simply referred to as an "optical fiber 4") has a first core 1 forming a first sea portion comprising a PMMA-based resin, a first cladding 2 surrounding the periphery of the first core 1, and seven first island portions 3 formed inside the first core. The plastic optical fiber 4 shown in FIG. 1 has a sea-island structure composed of the first sea portion formed in the first core 1, and the seven first island portions 3 formed inside the first core.

FIG. 2 shows a schematic cross-sectional view of another example of the plastic optical fiber in the present embodiment. In FIG. 2, a plastic optical fiber 4A (hereinafter also simply referred to as an "optical fiber 4A") has a first core 1 forming a first sea portion comprising a PMMA-based resin, a first cladding 2 surrounding the periphery of the first core 1, and seven first island portions 7 formed inside the first core. The first island portion 7 is composed of a second cladding 6 on the outer peripheral side, and a second core 5 forming a second sea portion comprising a PMMA-based resin inside the second cladding 6. The optical fiber 4A shown in FIG. 2 also has a sea-island structure composed of the first sea portion formed in the first core 1, and the seven first island portions 7 formed inside the first core, like the optical fiber 4 shown in FIG. 1.

FIG. 3 shows a schematic cross-sectional view of still another example of the plastic optical fiber in the present embodiment. In FIG. 3, a plastic optical fiber 4B (hereinafter also simply referred to as an "optical fiber 4B") has a first core 1 comprising a PMMA-based resin forming a first sea portion, a first cladding 2 surrounding the periphery of the first core 1, one first island portion 8 formed inside the first core, and a second island portion 11 formed inside the first island portion 8. The first island portion 8 has a second cladding 9 on the outer peripheral side, and a second core 10 forming a second sea portion comprising a PMMA-based resin inside the second cladding 9. In the second island portion 11, a third cladding 12, a third core 13, a fourth cladding 14, and a fourth core 15 are alternately formed in this order from the inside of the second core 10 toward the inner direction of the second island portion 11. The second island portion 11 of the optical fiber 4B shown in FIG. 3 is composed of two claddings and two cores, but the plastic optical fiber in the present embodiment is not limited to this form. The second island portion 11 may be composed of one cladding and one core, and the entire plastic optical fiber may be composed of three claddings and three cores. The second island portion 11 may be composed of three or more claddings and three or more cores, and the entire plastic optical fiber may be composed of five or more claddings and five or more cores. The second island portion 11 may not be formed, and the entire plastic optical fiber may be composed of two claddings and two cores.

<Core>

The core of the plastic optical fiber in the present embodiment, for example, is a portion that transmits light, and is an optically transparent portion whose periphery is surrounded by a cladding having a lower refractive index than the core. The form of the core is not particularly determined, but a form in which the cross section is circular is preferred because light can be efficiently reflected. In the case of a structure in which the core has an inner periphery and an outer periphery, only the outer periphery should be surrounded by the cladding.

The material that can be used as the core needs to be a material having both transparency and flexibility, and PMMA-based resins are preferred. In the case of a PMMA-based resin, a low transmission loss plastic optical fiber suitable for optical communication applications can be provided.

The PMMA-based resin that can be used as the core refers to a homopolymer of methyl methacrylate, or a copolymer comprising 50% by mass or more of a unit derived from methyl methacrylate. The PMMA-based resin may be a copolymer comprising a unit derived from methyl methacrylate, and a unit derived from a component copolymerizable with methyl methacrylate. The component copolymerizable with methyl methacrylate is not particularly limited, and examples thereof include acrylic esters such as methyl acrylate, ethyl acrylate, and butyl acrylate, methacrylic esters such as ethyl methacrylate, propyl methacrylate, and cyclohexyl methacrylate, acrylamides such as acrylamide, methylacrylamide, dimethylacrylamide, N-isopropylacrylamide, and N-methylolacrylamide, methacrylamides such as methacrylamide, methylmethacrylamide, and dimethylmethacrylamide, maleimides such as isopropylmaleimide, acrylic acid, methacrylic acid, and styrene. Two or more may be selected from among these. The weight average molecular weight of the PMMA-based resin is preferably 80,000 to 200,000, and particularly, more preferably 100,000 to 120,000, in terms of polystyrene from the viewpoint of the melt flow (ease of molding).

When the plastic optical fiber in the present embodiment has a plurality of cores, the respective cores are preferably formed of the same material because when the cores are of the same material, the speed of light propagating through the respective cores is the same, and therefore the band of the optical fiber improves.

In the present embodiment, the number of cores forming sea portions is not particularly limited and may be one or plural, but the number of sea portions (cores) in contact with the first cladding is preferably one as in the optical fiber 4 in FIG. 1 and the optical fiber 4A in a figure because the light-receiving area increases.

The total of the cross-sectional areas of the cores constituting the optical fiber preferably accounts for 50% or more of the entire cross-sectional area of the optical fiber in the present embodiment. When the total of the cross-sectional areas of the cores accounts for 50% or more, the light-receiving area increases sufficiently, and therefore, for example, longer distance transmission is enabled. From the same viewpoint, the total of the cross-sectional areas accounts for more preferably 60% or more, 65% or more, 70% or more, 75% or more, or 80% or more, and further preferably 85% or more, 87% or more, 89% or more, 90% or more, 91% or more, 92% or more, 93% or more, 94% or more, or 95% or more. The ratio of the cross-sectional area of the core constituting the optical fiber in the entire cross-sectional area of the optical fiber can also be expressed by the polymer flow rate ratio described later.

<Cladding>

The cladding of the plastic optical fiber in the present embodiment is, for example, a portion having a lower refractive index than the core, provided in order to reflect light propagating through the core. The cladding may not only be located so as to surround the core, but may also be present as an island portion inside the core as the sea portion.

The material that can be used as the cladding is not particularly limited as long as it is, for example, a material having a lower refractive index than the core formed inside the cladding. Examples of the material include glass and resins. Among them, preferably, fluororesins are suitably used from the viewpoint of high transmittance of the light used. By using fluororesins as the material of the cladding, the transmission loss can be even more suppressed.

Examples of the fluororesins include fluorinated methacrylate-based polymers, polyvinylidene fluoride-based resins, and ethylene-tetrafluoroethylene-based copolymers. The fluorinated methacrylate-based polymers are not particularly limited, but from the viewpoint of high transmittance and excellent heat resistance and moldability, acrylate monomers or methacrylate monomers containing fluorine, such as fluoroalkyl methacrylates, fluoroalkyl acrylates, and α-fluoro-fluoroalkyl acrylates are preferred. The fluorinated methacrylate-based polymers may be copolymers comprising units derived from (meth)acrylate monomers containing fluorine, and units derived from other components copolymerizable therewith, and copolymers with units derived from copolymerizable hydrocarbon-based monomers such as methyl methacrylate are preferred. It is preferred to provide a copolymer of a unit derived from a (meth)acrylate monomer containing fluorine, and a unit derived from a hydrocarbon-based monomer copolymerizable therewith because the refractive index can be controlled.

On the other hand, the polyvinylidene fluoride-based resins are not particularly limited, but from the viewpoint of excellent heat resistance and moldability, homopolymers of vinylidene fluoride; copolymers of vinylidene fluoride and at least one or more monomers selected from the group consisting of tetrafluoroethylene, hexafluoropropene, trifluoroethylene, hexafluoroacetone, perfluoroalkyl vinyl ethers, chlorotrifluoroethylene, ethylene, and propylene; and alloys of these polymers comprising units derived from a vinylidene fluoride component and PMMA-based resins are preferred.

Further, from the viewpoint of heat resistance, copolymers of polyvinylidene fluoride, hexafluoropropene, and tetrafluoroethylene are preferred, more preferably copolymers comprising 40 to 62 mol % of a vinylidene fluoride component, 28 to 40 mol % of a tetrafluoroethylene component, and 8 to 22% of a hexafluoropropene component are preferred, and further, resins in which for the polymers, the refractive index measured at the sodium D line at 20° C. is 1.35 to 1.37, the value of Shore D hardness (ASTMD2240) at 23° C. is 38 to 45, and the melt flow rate MFR (ASTM D1238, load 10 kg, orifice diameter 2 mm, length 8 mm, the number of g of the resin flowing from the nozzle for 10 min) at 240° C. satisfies the relationship 15<MFR<(5/9)×240−100 are preferred because the manufacture of the optical fiber is easy. The copolymers of polyvinylidene fluoride, hexafluoropropene, and tetrafluoroethylene may be copolymers with trifluoroethylene, hexafluoroacetone, perfluoroalkyl vinyl ethers, chlorotrifluoroethylene, ethylene, propylene, or the like within the component ratio.

The ethylene-tetrafluoroethylene-based copolymers are not particularly limited, but modified ethylene-tetrafluoroethylene-based copolymer resins having a melting point in the range of 150 to 200° C., having a refractive index of 1.37 to 1.41 measured at the sodium D line at 20° C., having a melt flow rate (230° C., load 3.8 kg, orifice diameter 2 mm, length 8 mm) of 5 to 100 g/10 min, and having a reactive functional group terminal are preferred. The modified fluororesins refer to polymers of ethylenic monomers whose all or some hydrogen atoms are replaced by fluorine atoms (which may comprise halogen atoms other than fluorine, such as chlorine, and will hereinafter also be referred to as "fluorine-containing monomers"), or copolymers with monomers copolymerizable with the fluorine-containing monomers, modified by the introduction of reactive functional groups (for example, carbonate groups (carbonyldioxy groups), ester groups, haloformyl groups, or carboxyl groups) into the main chains or the side chains. Here, "having a reactive functional group terminal" refers to having a reactive functional group at a terminal of a main chain and/or a side chain.

By introducing the above reactive functional group, a fiber excellent in chemical resistance, heat resistance, and the like is provided. From the viewpoint of chemical resistance and heat resistance, among reactive functional groups, those having carbonate groups are particularly preferred. For modified fluororesins into which reactive functional groups having carbonate groups are introduced, they can be easily introduced by using a peroxycarbonate as a polymerization initiator during the polymerization of the modified fluororesins.

The introduction of these reactive functional groups can be performed by a known method, but they are preferably introduced into the copolymer as a polymerization initiator, and the amount of the polymerization initiator is preferably 0.05 to 20 parts by mass based on 100 parts by mass of the obtained copolymer.

The above modified fluororesins comprise ethylene-tetrafluoroethylene-based copolymers as main skeletons. The molar ratio of ethylene/tetrafluoroethylene in the ethylene-tetrafluoroethylene-based copolymers is not particularly limited but is preferably 70/30 to 30/70 from the viewpoint of the balance between moldability and chemical resistance.

Further, the ethylene-tetrafluoroethylene-based copolymers may be those obtained by copolymerizing, together with tetrafluoroethylene and ethylene, other monomers copolymerizable therewith (for example, olefins such as hexafluoropropylene, hexafluoroisobutene, propylene, 1-butene, 2-butene, vinyl chloride, vinylidene chloride, vinylidene fluoride, chlorotrifluoroethylene, vinyl fluoride, hexafluoroisobutene, and perfluoro(alkyl vinyl ethers).

In this case, the molar ratio of ethylene/tetrafluoroethylene/other copolymerizable monomers is not particularly limited but is preferably (10 to 80)/(20 to 80)/(0 to 40) from the viewpoint of the balance between moldability and chemical resistance.

Examples of more preferred modified fluororesins include carbonyldioxy group-containing copolymers having polymer chains obtained from monomer components comprising 62 to 80 mol % of tetrafluoroethylene, 20 to 38 mol % of ethylene, and 0 to 10 mol % of a monomer copolymerizable therewith; and carbonyldioxy group-containing copolymers having polymer chains obtained from monomer components comprising 20 to 80 mol % of tetrafluoroethylene, 10 to 80 mol % of ethylene, 0 to 30 mol % of hexafluoropropylene, and 0 to 10 mol % of a monomer copolymerizable therewith. The above modified fluororesins are excellent particularly in chemical resistance and heat resistance and therefore preferred.

The melting point of the modified fluororesin is preferably in the range of 150° C. to 200° C. It is preferred that the melting point is in such a temperature range because molding is possible at a molding temperature of 300° C. or less at which the thermal decomposition of the polymethyl methacrylate-based resin is permissible. The measurement of the melting point can be performed by differential scanning calorimetry. For example, the melting point can be measured by increasing the temperature of a sample at a temperature increase rate of 20° C./min using a differential scanning calorimeter (EXSTAR DSC6200) manufactured by Seiko Instruments Inc.

In the present embodiment, the modified fluororesins are preferably ethylene-tetrafluoroethylene-based copolymer resins having reactive functional group terminals. The ethylene-tetrafluoroethylene-based copolymer resins may be those obtained by copolymerizing, together with tetrafluoroethylene and ethylene, a monomer such as propylene. Among these, it is preferred that the melting point is in the range of 150° C. to 200° C., and the melt flow index (230° C., load 3.8 kg, orifice diameter 2 mm, length 8 mm) is 5 to 100 g/10 min because molding is possible at a molding temperature of 300° C. or less at which the thermal decomposition of the polymethyl methacrylate-based resin is permissible. For the resins, usually, the value of Shore D hardness (ASTM D2240) at 23° C. is in the range of 60 to 80. It is considered that by introducing the reactive functional group into the cladding resin, the adhesiveness to the core occurs, and even the hard cladding resin is less likely to peel easily from the core, although the Shore D hardness increases, and the problem of the core protruding from the cladding does not occur.

As such modified fluororesins, examples of commercial products include NEOFLON EFEP RP5000 and RP4020 manufactured by Daikin Industries, Ltd., and Fluon LM-ETFE AH2000 manufactured by Asahi Glass Co., Ltd. Among these, NEOFLON EFEP RP5000 and RP4020 are carbonate-modified ethylene-tetrafluoroethylene-based copolymers containing carbonyldioxy groups as reactive functional groups.

The thickness of the cladding is not particularly limited, but when the cladding is thin, light may not reflect sufficiently, and when the cladding is too thick, the light-receiving area may be decreased. For the first cladding, in order to maintain the mechanical strength of the optical fiber in the present embodiment, 1 μm to 100 μm is preferred, and 5 μm to 50 μm is more preferred. For a cladding (n) other than the first cladding, it does not influence the mechanical strength, and therefore 1 μm to 20 μm is preferred, and further 1 μm to 10 μm is more preferred.

In the present embodiment, the number of claddings is not particularly limited and may be one or plural. When the plastic optical fiber in the present embodiment has a plurality of claddings, the respective claddings are preferably formed of the same material from the viewpoint of making the NA of the island portions calculated by the following formula (1) the same. Here, NA is a value calculated by the following formula (1) and determines light reflection properties.

It is preferred to make light reflection properties uniform for islands because even a fiber in which a plurality of islands are present has homogeneous properties as a whole.

$$NA = (N_{core}^2 - N_{clad}^2)^{0.5} \quad (1)$$

$N_{core}$ the refractive index of the core
$N_{clad}$ the refractive index of the cladding <Island Portion>

The plastic optical fiber in the present embodiment is characterized in that an island portion is present in the interior of a core as a sea portion. The island portion in the present embodiment has, for example, the function of reflecting light propagating through the core forming the sea portion. The first island portion in the present embodiment should be formed so that the refractive index is lower at least on the outer periphery than the refractive index of the first sea portion formed in the first core, and may be formed so that the refractive index is low throughout.

The plastic optical fiber in the present embodiment has the island portion, and thus even when the plastic optical fiber is bent, light propagating through the interior of the core is inhibited from leaking to the exterior of the plastic optical fiber, reducing the bending loss. The number of island portions is not particularly limited as long as it is one or more. But, the number of island portions is preferably plural (2 or more), more preferably 2 to 500, more preferably 3 to 300, and further, more preferably 3 to 100, or 3 to 40. When the number of island portions is large, the bending loss can be even more reduced, but the proportion of the core in the cross-sectional area of the entire optical fiber decreases, and therefore the amount of light received decreases. From such a viewpoint, the number of island portions in the present embodiment is preferably within the above range.

The first island portion, for example, preferably has a second cladding and a second core forming a second sea portion inside the second cladding, like the first island portion 7 shown in FIG. 2, and the first island portion 8 shown in FIG. 3. When the first island portion has the second cladding and the second core, the island portion can also propagate light. In the present embodiment, when the first island portion has the second cladding, it is not always necessary to form the second core.

The plastic optical fiber in the present embodiment, for example, preferably further has a second island portion inside the second core, like the second island portion 11 shown in FIG. 3. When the plastic optical fiber has the second island portion inside the second core, the bending loss of light propagating through the second island portion can be reduced.

The second island portion in the present embodiment, for example, preferably has a structure in which one or more claddings and one or more cores are alternately formed in this order toward the inner direction, like the second island portion 11 shown in FIG. 3. When the second island portion has such a structure, the bending loss can be more effectively reduced.

The cladding and the core forming the sea portion inside the cladding may be in direct contact with each other, or another intermediate layer may be formed between the cladding and the core. The intermediate layer is preferably optically transparent, and in this case, the intermediate layer can be regarded as substantially part of the core.

The optical fiber in the present embodiment preferably has a layer having a lower refractive index than the first cladding (low refractive index layer) outside the first cladding in order to reduce the bending loss as much as possible. The low refractive index layer can reflect light leaking from the first cladding, and therefore the effect can be expected. The material of the low refractive index layer is not particularly limited as long as it is a material having a lower refractive index than the material of the first cladding.

In the description of this application, the "refractive index" means a value calculated based on JIS K7142 2014.

<Plastic Optical Fiber Cable>

The plastic optical fiber cable in the present embodiment comprises the plastic optical fiber in the present embodiment and a resin coating this plastic optical fiber. In the plastic optical fiber cable in the present embodiment, the plastic optical fiber in the present embodiment is coated with a coating layer composed of a resin.

<Coating Layer>

In the present embodiment, the coating layer is formed on the outer periphery of the above-described plastic optical fiber by coating. FIG. 4 shows a schematic cross-sectional view of one example of the plastic optical fiber cable in the present embodiment. In FIG. 4, a plastic optical fiber cable 17 has a configuration in which a coating layer 16 is formed outside the first cladding 2 of the plastic optical fiber 4A shown in FIG. 2. The resin used as the coating layer is not particularly limited, and, for example, polyethylene-based resins, crosslinked polyethylene-based resins, polypropylene-based resins, polyamide-based resins such as polyamide 6, polyamide 6T, polyamide 66, polyamide 11, and polyamide 12, vinyl chloride-based resins, fluororesins such as vinylidene fluoride and PFA, and polyimide resins are used.

<Outer Coating Layer>

In the plastic optical fiber cable in the present embodiment, the coating layer can also be used as an outermost surface layer, but it is also possible to provide, on its outer periphery, an outer coating layer (also referred to as an "outer jacket") comprising a thermoplastic resin such as polyamide 12, a soft polyamide, polyethylene, polyvinyl chloride, polypropylene, or a fluororesin, to use the plastic optical fiber cable in the present embodiment as a more reinforced plastic optical fiber cable.

The plastic optical fiber cable in the present embodiment may be one obtained by coating one plastic optical fiber, or one obtained by bundling two or more plastic optical fibers and coating the bundle with an outer coating layer or the like. Further, a plurality of cables each obtained by coating one plastic optical fiber may be bundled and further coated. Further, the number of coating layers may be three or more as needed.

The plastic optical fiber is excellent in bendability and therefore is preferably used for distorted wiring. By providing distorted wiring, laying in a gap in the device used is possible, and the flexibility of wiring design increases. It is preferred to provide multi-coupled wiring in laying in a gap in a device because laying is easy.

<Connector-Attached Optical Fiber Cable>

The connector-attached plastic optical fiber cable in the present embodiment comprises the plastic optical fiber cable in the present embodiment and connectors attached to both ends of this plastic optical fiber cable. The plastic optical fiber cable in the present embodiment may be used alone, but particularly in optical transmission applications, attaching suitable connectors to both ends makes the connection between devices easy. The connectors that can be used are not particularly limited, and known connectors can be used. Particularly, in the plastic optical fiber cable in the present embodiment, the connectors can be attached to the coating layer by laser welding. In this case, in the plastic optical fiber cable in the present embodiment, the connectors are attached to the plastic optical fiber cable in a welded state. Such a form is particularly preferred because the connectors are firmly attached to the plastic optical fiber cable by laser welding.

The plastic optical fiber in the present embodiment or the plastic optical fiber cable in the present embodiment is excellent as a step index type plastic optical fiber and can be preferably used for optical communication systems and plastic optical fiber sensors. Therefore, the present invention includes an optical communication system having the plastic optical fiber cable in the present embodiment, and a plastic optical fiber sensor having the plastic optical fiber in the present embodiment. In the optical communication system, from the viewpoint of reliably transmitting communication data, the light passing through the cores of the plastic optical fiber cable is preferably light emitted from the same light source. It is also possible to communicate different light, that is, different data, to the cores, but it is necessary to accurately align the cores during multi-coupling wiring, and as a result, multi-coupling connection is very difficult.

<Method for Manufacturing Plastic Optical Fiber in the Present Embodiment>

When the plastic optical fiber and the plastic optical fiber cable in the present embodiment are manufactured, they can be obtained, for example, by a known composite spinning method. More specifically, the materials (for example, resins) of the components (the cladding, the core, and the island portion) constituting the plastic optical fiber in the present embodiment are simultaneously introduced into a composite spinning die for forming into a predetermined structure, to obtain a plastic optical fiber (plastic optical bare fiber). By coating the outer periphery of this plastic optical bare fiber with a heat-melted coating resin through a crosshead die, a plastic optical fiber cable can be obtained.

For the method for adjusting the above-described cross-sectional area ratio (polymer flow rate ratio), a known method can be adopted. For example, the speeds of respective liquid feed pumps feeding core and cladding resins can be changed to adjust the ratio of the flow rate of the core resin in the total flow rate of the core and cladding resins (flow rate ratio).

EXAMPLES

The present embodiment will be described below by giving specific Examples and Comparative Examples, but the present embodiment is not limited to the Examples described later. First, evaluation items will be described.

<Bending Loss>

For the Examples and the Comparative Examples, the rate of decrease in the amount of light in bending at 90° along a cylinder having a radius of 5 mm was measured. Those in which the measured value was 0.5 dB or less were considered acceptable.

<Connection Loss>

For the Examples and the Comparative Examples, F07 connectors were attached to both ends of 2 m of an optical fiber, and the amount of light was measured by an optical power meter (Photom 205A manufactured by Graytechnos). Then, the optical fiber was divided into two at the center of the axial direction of the optical fiber, and F07 connectors were attached to the divided portions. The end surfaces were sequentially polished with lapping films having particle sizes of 30 µm, 9 µm, and 1 µm and finished flat. Then, these were connected by a relay adapter, and the amount of light was measured again. Cases where the difference in the amount of light between before and after division was 1.5 dB or less were considered acceptable.

<Transmission Loss>

For the Examples and the Comparative Examples, measurement was performed by a 22 m-2 m cutback method using light having an incident NA of 0.15 and a wavelength of 650 nm as a light source. Those in which the transmission loss was 300 dB/km or less were considered acceptable.

Example 1

Polymethyl methacrylate (refractive index 1.491) as a material constituting a first core and second cores, and a copolymer of vinylidene fluoride, tetrafluoroethylene, and hexafluoropropene (refractive index 1.37) as a material constituting a first cladding and second claddings were respectively placed in the core resin distribution chamber and cladding resin distribution chamber of a 1-sea-19-island composite spinning die so that the flow rate ratio was core/cladding=90/10, and a 1-sea-19-island plastic optical bare fiber having a diameter of 1 mm was manufactured by composite spinning. The manufactured plastic optical bare fiber was coated (coating diameter 2.2 mm) with polyethylene (SUNTEC-LD M1920 manufactured by Asahi Kasei Corporation) to provide a plastic optical fiber cable. When a cross section was observed by a digital microscope (VHX-5000 manufactured by KEYENCE CORPORATION), it was confirmed that the second claddings were formed in all 19 first island portions, and the first core that was a sea portion, and the second cores present in the interior of the island portions both guided light. The plastic optical fiber cable had the structure shown in the schematic cross-sectional view of FIG. 5. The plastic optical fiber 30 shown in FIG. 5 has a first core 21 forming a first sea portion, a first cladding 22 surrounding the periphery of the first core 21, and 19 first island portions 27 formed inside the first core 21, and the first island portion 27 is composed of a second cladding 26 on the outer peripheral side, and a second core 25 forming a second sea portion inside the second cladding 26. The transmission loss was 154 dB/km, which was acceptable. The bending loss was 0.3 dB, which was acceptable. The connection loss was 1.0 dB, which was acceptable. The refractive index of the claddings was lower than the refractive index of the cores.

Example 2

A 1-sea-19-island plastic optical fiber cable having a diameter of 1 mm was manufactured as in Example 1 except that a fluorinated methacrylate-based polymer was used as the first cladding and the second claddings. When a cross section was observed as in Example 1, it was confirmed that the second claddings were formed in all 19 first island portions, and the first core that was a sea portion, and the second cores present in the interior of the first island portions both guided light. The plastic optical fiber cable had the structure shown in the schematic cross-sectional view of FIG. 5. The transmission loss was 148 dB/km, which was acceptable. The bending loss was 0.3 dB, which was acceptable. The connection loss was 0.9 dB, which was acceptable. The refractive index of the claddings was lower than the refractive index of the cores.

Example 3

A 1-sea-19-island plastic optical fiber cable having a diameter of 1 mm was manufactured as in Example 1 except that a copolymer of ethylene, tetrafluoroethylene, and hexafluoropropene was used as the first cladding and the second claddings. When a cross section was observed, it was confirmed that the second claddings were formed in all 19 first island portions, and the first core that was a sea portion, and the second cores present in the interior of the island portions both guided light. The plastic optical fiber cable had the structure shown in the schematic cross-sectional view of FIG. 5. The transmission loss was 161 dB/km, which was acceptable. The bending loss was 0.3 dB, which was acceptable. The connection loss was 1.1 dB, which was acceptable. The refractive index of the claddings was lower than the refractive index of the cores.

Example 4

A 1-sea-19-island plastic optical fiber cable having a diameter of 1 mm was manufactured as in Example 1 except that an ethylene-tetrafluoroethylene-based copolymer resin having a reactive functional group terminal was used as the first cladding and the second claddings. When a cross section was observed, it was confirmed that the second claddings were formed in all 19 first island portions, and the first core that was a sea portion, and the second cores present in the interior of the island portions both guided light. The plastic optical fiber cable had the structure shown in the schematic cross-sectional view of FIG. 5. The transmission loss was 159 dB/km, which was acceptable. The bending loss was 0.3 dB, which was acceptable. The connection loss was 0.9 dB, which was acceptable. The refractive index of the claddings was lower than the refractive index of the cores.

Example 5

A 1-sea-19-island plastic optical fiber cable having a diameter of 1 mm was manufactured as in Example 1 except that the flow rate ratio was core/cladding=85/15. When a cross section was observed, it was confirmed that the second claddings were formed in all 19 first island portions, and the first core that was a sea portion, and the second cores present in the interior of the island portions both guided light. The plastic optical fiber cable had the structure shown in the schematic cross-sectional view of FIG. 5. The transmission loss was 162 dB/km, which was acceptable. The bending loss was 0.4 dB, which was acceptable. The connection loss was 1.2 dB, which was acceptable. The refractive index of the claddings was lower than the refractive index of the cores.

Example 6

A 1-sea-19-island plastic optical fiber cable having a diameter of 1 mm was manufactured as in Example 1 except that the flow rate ratio was core/cladding=80/20. When a cross section was observed, it was confirmed that the second claddings were formed in all 19 first island portions, and the first core that was a sea portion, and the second cores present in the interior of the island portions both guided light. The plastic optical fiber cable had the structure shown in the schematic cross-sectional view of FIG. 5. The transmission loss was 160 dB/km, which was acceptable. The bending loss was 0.4 dB, which was acceptable. The connection loss was 1.3 dB, which was acceptable. The refractive index of the claddings was lower than the refractive index of the cores.

Example 7

A 1-sea-19-island plastic optical fiber cable having a diameter of 1 mm was manufactured as in Example 1 except that the flow rate ratio was core/cladding=50/50. When a cross section was observed, it was confirmed that the second claddings were formed in all 19 first island portions, and the first core that was a sea portion, and the second cores present in the interior of the island portions both guided light. The plastic optical fiber cable had the structure shown in the schematic cross-sectional view of FIG. 5. The transmission loss was 160 dB/km, which was acceptable. The bending loss was 0.4 dB, which was acceptable. The connection loss was 1.4 dB, which was acceptable. The refractive index of the claddings was lower than the refractive index of the cores.

Example 8

A plastic optical fiber was spun as in Example 1 except that the composite die used was a two-type nine-layer composite die, and a die in which three cores and three claddings were alternately concentrically formed was used. Thus, a plastic optical fiber having a cross section as shown in FIG. 3 was manufactured. The transmission loss was 152 dB/km, which was acceptable. The bending loss was 0.4 dB, which was acceptable. The connection loss was 1.0 dB, which was acceptable. The refractive index of the claddings was lower than the refractive index of the cores.

Comparative Example 1

Polymethyl methacrylate (refractive index 1.491) as a core resin, and a copolymer of vinylidene fluoride, tetrafluoroethylene, and hexafluoropropene (refractive index 1.37) as a cladding resin were respectively placed in the core resin distribution chamber and cladding resin distribution chamber of a 19-island composite spinning die, and a 19-island plastic optical bare fiber having a diameter of 1 mm was manufactured by composite spinning. A plastic optical fiber cable was formed with the manufactured optical bare fiber as in Example 1. When a cross section was observed, it was confirmed that all 19 island portions guided light. The plastic optical fiber cable had the structure shown in the schematic cross-sectional view of FIG. 6. The optical fiber 31 shown in FIG. 6 is composed of a cladding 29 and 19 cores 28 formed inside the cladding 29. The transmission loss was 161 dB/km, which was acceptable. The bending loss was 0.3 dB, which was acceptable. The connection loss was 1.8 dB, which was rejected. The flow rate ratio was core/cladding=90/10.

Comparative Example 2

Polymethyl methacrylate (refractive index 1.491) as a core resin, and a copolymer of vinylidene fluoride, tetrafluoroethylene, and hexafluoropropene (refractive index 1.37) as a cladding resin were respectively placed in the core resin distribution chamber and cladding resin distribution chamber of a single-core composite spinning die, and a single-core plastic optical bare fiber having a diameter of 1 mm was manufactured by composite spinning. A plastic optical fiber cable was formed with the manufactured plastic optical bare fiber as in Example 1. When a cross section was observed, it was confirmed that the first core that was a sea portion guided light. The plastic optical fiber cable had the structure shown in the schematic cross-sectional view of FIG. 7. The plastic optical fiber 34 shown in FIG. 7 is composed of a cladding 33 and a core 32 formed inside the cladding 33. The transmission loss was 139 dB/km, which was acceptable. The bending loss was 0.7 dB, which was rejected. The connection loss was 0.6 dB, which was acceptable. The flow rate ratio was core/cladding=90/10.

Comparative Example 3

A plastic optical fiber cable was manufactured as in Example 1 except that a polycarbonate was used as the core resin. It was confirmed that the first core that was a sea portion, and the second cores present in the interior of the first island portions both guided light. The plastic optical fiber cable had the structure shown in the schematic cross-sectional view of FIG. 5. The transmission loss was 1100 dB/km, which was rejected. The bending loss was 0.3 dB, which was acceptable. The connection loss was 1.2 dB, which was acceptable.

This application is based on Japanese Patent Application No. 2017-167847 filed on Aug. 31, 2017, the contents of which are incorporated herein by reference.

REFERENCE SIGNS LIST

1, 21 . . . first core,
2, 22 . . . first cladding,
3, 7, 8, 27, 31, 34 . . . first island portion,
4, 4A, 4B, 30 . . . plastic optical fiber,
5, 10, 25 . . . second core,
6, 9, 26 . . . second cladding,
11 . . . second island portion,
12 . . . third cladding,
13 . . . third core,
14 . . . fourth cladding,
15 . . . fourth core,
16 . . . coating layer,
17 . . . plastic optical fiber cable,
28, 32 . . . core,
29, 33 . . . cladding.

The invention claimed is:

1. A plastic optical fiber comprising:
   a first cladding;
   a first core forming a first sea portion inside the first cladding; and
   a first island portion formed inside the first core with at least an outer periphery having a lower refractive index than the first sea portion,
   wherein the first core comprises a polymethyl methacrylate-based resin.

2. The plastic optical fiber according to claim 1, comprising a plurality of the first island portions.

3. The plastic optical fiber according to claim 1, wherein the first island portion has a second cladding and a second core forming a second sea portion inside the second cladding.

4. The plastic optical fiber according to claim 3, further comprising a second island portion inside the second core.

5. The plastic optical fiber according to claim 4, wherein the second island portion has a structure in which one or more claddings and one or more cores are alternately formed in this order toward an inner direction.

6. The plastic optical fiber according to claim 1, wherein when the plastic optical fiber comprises a plurality of cores, the respective cores constituting the optical fiber are formed of the same material.

7. The plastic optical fiber according to claim 1, wherein a total of cross-sectional areas of the cores constituting the optical fiber accounts for 50% or more of an entire cross-sectional area of the optical fiber.

8. The plastic optical fiber according to claim 1, wherein when the plastic optical fiber comprises a plurality of claddings, the respective claddings constituting the optical fiber are formed of the same material.

9. The plastic optical fiber according to claim 1, wherein at least one of the claddings constituting the optical fiber is a fluororesin.

10. The plastic optical fiber according to claim 1, comprising a layer having a lower refractive index than the first cladding, outside the first cladding.

11. The plastic optical fiber according to claim 1, for use in distorted wiring.

12. The plastic optical fiber according to claim 1, for use in multi-coupled wiring.

13. A plastic optical fiber cable comprising:
   the plastic optical fiber according to claim 1; and
   a resin coating the plastic optical fiber.

14. A connector-attached plastic optical fiber cable comprising:
   the plastic optical fiber cable according to claim 13; and
   connectors attached to both ends of the plastic optical fiber cable.

15. The connector-attached plastic optical fiber cable according to claim 14, wherein the connectors are attached to the plastic optical fiber cable in a welded state.

16. An optical communication system comprising the plastic optical fiber according to claim 1.

17. The optical communication system according to claim 16, wherein the plastic optical fiber cable has a plurality of cores, and light passing through the cores comes from a same light source.

18. A plastic optical fiber sensor comprising the plastic optical fiber according to claim 1.

* * * * *